March 1, 1966  D. COHN  3,238,394
ELECTRIC POWER UNIT FOR TOYS
Filed May 5, 1961
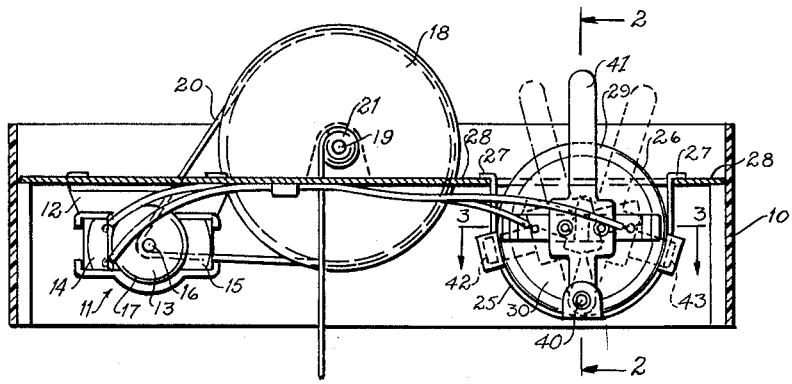
INVENTOR.
DAVID COHN
BY
ATTORNEYS

United States Patent Office 3,238,394
Patented Mar. 1, 1966

3,238,394
ELECTRIC POWER UNIT FOR TOYS
David Cohn, Brooklyn, N.Y., assignor to T. Cohn Incorporated, Brooklyn, N.Y., a corporation of New York
Filed May 5, 1961, Ser. No. 108,056
7 Claims. (Cl. 307—138)

This invention relates to electric power units, and more particularly to a small power unit operated by electricity for use with a mechanical toy.

There are many toys made today which are intended to be educational as well as amusing, and to this end they do not rely entirely on the imagination of the child to manipulate devices in make believe simulation of something he has observed being used in commercial practice or has dreamed up solely as a product of his imagination. On the contrary, they strive to provide an inexpensive simulation of a practical instrumentality which the child can learn to operate and also study and experiment with to stimulate his native inquisitiveness and desire to learn, to talk about with other children and ask questions of older people who can direct his thinking and thus develop whatever potential interests may manifest themselves.

To this end, it is the general object of the present invention to provide an inexpensive power unit operated by electricity which can be installed as the power unit of a particular toy or which can be used for connection with and operation of several different toys or power driven mechanisms.

A specific and primary object of the present invention is the provision of a small electric motor adapted to be operated by a small battery, preferably of the dry cell type, which will supply power to operate a mechanism in a given direction or in a direction reverse thereto. For example, if the mechanism were to operate to move an object up an incline and then along a horizontal path, from whence the force of gravity could not effect its return, the direction of rotation of the motor could be reversed to supply the power for returning the object to its original position, and the descent of the object down the incline would be controlled by the operation of the motor, not by the pull of gravity.

Thus in its broader aspects, the present invention contemplates an electric motor connected in circuit with a battery having the usual positive and negative poles. A switch is interposed in the circuit which normally occupies an "off" position and is movable to either one of two "on" positions. The circuit is so formed that reverse polarity can be obtained, i.e., in one "on" position of the switch the electric current flows from the battery through the motor in one direction and in the other "on" position the flow of electric current through the motor is in the opposite direction, whereby under control of the switch the armature of the motor and, hence, its drive shaft, can be made to rotate in either direction, as desired.

More specifically, the electric motor is mounted in a frame and connected in electric circuit with a dry cell battery of the flashlight type, which is supported in a cradle also mounted in the frame. A lever arm is pivotally mounted at one end on or near to one end of the cradle and approximately midway of its length it is provided with two separate electric contacts which extend laterally therefrom one at each side. The distance between the contacts is less than the diameter of the battery, whereby when the lever arm is in a center position both contacts engage the base of the battery which is exposed to serve as one of the battery poles. The other battery pole engages a portion of the cradle which is formed of electricity conducting material and extends to a point substantially coterminous with the base of the battery at opposite sides thereof. Each contact on the lever arm is connected by electricity conducting wire to one of the two terminals on the motor.

With the foregoing arrangement, when the lever arm is in the center position both contacts thereon engage only the base of the battery, i.e., a single pole thereof, and current does not flow through the switch. This is the "off" position. Should the lever arm be moved to the right, the right-hand contact is moved off the base of the battery and into engagement with the cradle, which is a conductor leading from the other pole of the battery, at the right-hand side of the battery. The left-hand or following contact slides across but remains in engagement with the base of the battery and electricity flows in a given direction through the circuit thus established from the battery to the motor, causing the motor armature to rotate in a given direction. If, now, the lever arm is moved from the right-hand position back past the center and to a left-hand position, the right-hand (or what was the leading) contact is carried into engagement with the base of the battery and the left-hand (or what was the following) contact is moved off the base of the battery and into engagement with the side of the cradle to the left of the battery. Since the wiring between the switch contacts and the motor terminals remains the same as before, a new circuit is thus established and the electric current flows through the circuit and motor in a direction reverse to that in which it previously flowed and the motor armature is caused to rotate in a direction opposite to that in which it was made to rotate when the switch was in the right-hand position.

In the accompanying drawings, the invention has been shown merely by way of example and in preferred form and obviously many variations and modifications may be made therein and in its mode of application which will still be comprised within its spirit. It is to be understood, therefore, that the invention is not limited to any specific form or embodiment, except insofar as such limitations are set forth in the appended claims.

Referring to the drawings:

FIG. 1 is a vertical section through the supporting frame, showing the mounting of the parts therein;

FIG. 2 is a sectional view, taken on the line 2—2 of FIG. 1, looking in the direction of the arrows;

FIG. 3 is a view taken on the line 3—3 of FIG. 1, looking in the direction of the arrows;

FIG. 4 is a diagrammatic view of one electric circuit; and

FIG. 5 is a diagrammatic view of the other electric circuit.

A preferred embodiment of the invention is shown in the drawings and since the invention is concerned with the electric power unit rather than any particular application thereof, a section only of a support frame 10 therefor is shown. A motor 11 operated by electricity is suitably mounted in the frame 10 and rigidly supported therein by a bracket 12. The motor 11 comprises an armature 13 arranged within a pair of electro-magnets 14 and 15, the armature 13 including a shaft 16 by which it is suitably journaled in bearings (not shown) at opposite ends of a housing 17, the shaft 16 extending beyond one end of the housing 17 to provide a power take-off shaft.

A driven member in the form of a pulley wheel 18 is shown mounted on a rotatable shaft 19 suitably journaled in the frame 10 for free rotation. The power take-off shaft and the pulley wheel 18 are connected by a belt 20, which may be made of vulcanized rubber composition or other suitable material. A second pulley wheel 21 (or other mechanism such as a gear wheel) is fixedly mounted on the shaft 19 for rotation therewith, and may be connected to whatever device is to be operated by the power unit.

Also mounted in the frame 10 is a cradle 25 formed of electricity conducting material and adapted to support a battery 26 therein. The cradle 25 is suspended in the frame 10 on flanges 27 which overlie a horizontally disposed partition 28 of the frame, and the battery 26 is removably seated therein. It can be seen in FIG. 2 that the battery 26 is of the dry cell type commonly used in a flashlight, having an insulation casing 29 enclosing all but its opposite ends. Within the insulation casing 29, the battery is enclosed in an electricity conducting casing, which is cylindrical and closed only at the bottom or base 30. The exposed base 30 of the battery constitutes one pole (the cathode or negative pole) of the battery and at the opposite end, insulated from the casing 29 there is a centrally located conductor constituting the other pole (the anode or positive pole) which presents an electric contact 31. When the battery 26 is in the cradle 25, the contact 31 is pressed into engagement with a tab 32 formed on the cradle 25. As already stated, the cradle 25 is formed of electricity conducting material and, hence, the electric charge from the contact 31 is conducted by the tab 32 through the cradle side walls 33 and 34 to terminals 35 and 36 comprised of outwardly bent portions of the cradle side walls at a point substantially coterminous with the base 30 of the battery and insulated in spaced relation thereto. This arrangement in effect provides two positively charged battery contacts, one located at each side of the negatively charged base 30.

Pivotally mounted on the cradle 25, as at 40, is one end of a lever arm 41, whereby the arm is adapted to be moved from a vertical position (see FIG. 1) to either side thereof, as indicated by the broken lines, in a plane parallel to the base 30 of the battery 26. At a point substantially midway of the length of the lever arm 41 and coincident with the horizontal center line of the battery base 30, a pair of separate electricity conducting contacts 42 and 43 are secured to the lever arm (which is made of stiff fiber, plastic or other non-electricity conducting material) to extend laterally therefrom, the contact 42 extending to the lefthand side and the contact 43 extending to the right-hand side. The contacts 42 and 43 are formed of resilient material and bent to provide contact points 44 and 45, respectively, which bear against the battery base 30 and can be moved into engagement with the terminals 35 and 36 on the cradle. The contacts 42 and 43 are connected by electricity conducting wires 46 and 47, to the two terminals 48 and 49, respectively, of the motor 11, which terminals in turn are connected to brushes arranged in running engagement with the commutator of the armature 13.

With the foregoing arrangement, when the lever arm 41 is in the vertical or center position both contact points 44 and 45 bear against the battery base 30 and no current flows through the wires 46 and 47 to the motor 11. However, when the lever arm 41 is moved to the right (FIG. 1) to the broken line position, the right-hand or leading contact point 45 will ride off the base 30 and into engagement with the cradle terminal 36. This establishes a closed circuit and electric current will flow through the wires 46 and 47 to the motor 11, say in the direction indicated by the arrows in FIG. 4. The flow of current causes the armature 13, and hence the shaft 16, to rotate in the direction of current flow through the motor 11. When the lever arm 41 is moved to the broken line position at the left-hand side of its vertical position, the contact point 44 is moved into engagement with the cradle terminal 35 and the contact point 45 remains in engagement with the battery base 30. Since the electric current flows from the positive to the negative pole of the battery, its direction of flow will be as indicated by the arrows in FIG. 5, or reverse to that in FIG. 4, and will cause the armature 13 of the motor 11 to turn in the direction of current flow therethrough, or in a direction reverse to that previously described. Hence, the motor 11 may be operated to run in either direction by reversing the polarity or direction in which the electric current run through the motor by means of a simple switch and battery contact arrangement.

It is pointed out that the foregoing preferred embodiment is but one of several arrangements which can be employed. For example, a battery such as the battery 26 but covered with insulation except at the contact 31 end thereof could be employed and provided with two exposed areas of the side edges of the cylindrical conductor encasement of the battery. Thus, with such a battery placed in the cradle 25 with the contact 31 in position to be engaged by the contact points 44 and 45, the exposed areas of the cylindrical encasement could take the place of the cradle terminals 35 and 36. The only difference would be that with the lever arm 41 in the right-hand position the flow of current would be in the direction shown in FIG. 5 and when in the left-hand position the direction of the flow of current would be as indicated in FIG. 4.

Still considering modifications from the standpoint of electricity supply, a battery of the wet or any other type could be used and wired to electricity conducting contacts to be engaged by the contact points 44 and 45, instead of the more direct battery pole engagement of the preferred embodiment.

Furthermore, instead of the lever arm 41 arrangement, a rotary switch could be arranged to move contact points comparable to the points 44 and 45 through an arc of 180° for engagement with but two contacts connected each to one of the poles of a battery, i.e., the contacts connected to the battery poles could be fixed and the rotatable switch contacts mounted in centered relation thereto to bridge them in one contact point to contact relation or in the reverse relation.

There are still other modifications which can be employed to effect the same results. One such modification could be that the switch element would comprise three fixed electric contacts to be engaged by the contact points 44 and 45. In such case the three fixed contacts would be disposed in substantially horizontal alignment with the center contact connected as by a wire to one pole of the battery and the two lateral contacts connected by wires to the other battery pole. In substance, this would be the equivalent of the arrangement shown in the drawings.

On the other hand, the poles of the battery could be connected by wires to two separate, fixed contacts and the movable arm 41 could be equipped with three separate contact points arranged in substantially horizontal alignment, the two laterally disposed contact points each being spaced from the center contact point a distance equal to the distance between the two fixed contacts connected to the battery. In such case one motor terminal would be connected to the center one of the three contact points and the other motor terminal would be connected to the two lateral contact points. Thus, when the arm 41 is moved sidewise to the right-hand position the center and the left-hand contact points will engage the two fixed contacts, and when the arm 41 is moved to the left-hand position the center and the right-hand contact points will engage the two fixed contacts, the center contact point engaging a different one of the two fixed contacts in each instance.

As already stated, the invention has been shown merely by way of example and in preferred form and many variations and modifications thereof may be made which will still be within its spirit and, therefore, the invention is not to be limited except as limitations may be set forth in the appended claims.

Having thus described my invention, what I claim is:

1. A reversing polarity device comprising a cradle, a battery supplying electricity supported in the cradle, said battery having a positive pole exposed at one end thereof and a negative pole exposed at the opposite end thereof, said cradle being formed to serve as a contact for one of said battery poles and a conductor leading from said contact along the side of the battery and terminating in juxtaposition to the other pole of the battery, a switch movably mounted in juxtaposition to the cradle and being formed with two contacts arranged in spaced-apart relation for bridging engagement, one with said other pole and one with said conductor, and separate electricity conducting means adapted for connecting said switch contacts each to a separate terminal on a motor, said switch normally occupying a position whereby its two contacts are out of said bridging engagement and being movable to bring its contacts into said bridging engagement selectively in one relation to the said other pole and conductor or into the reverse relation thereto.

2. A combination as in claim 1, wherein the said conductor is formed to present two separate terminals and the switch is movable to engage one of its contacts with said other pole and its other contact with one of said two terminals or to engage said one of its contacts with the other of said two terminals and its said other contact with said other pole.

3. A combination as in claim 2, wherein the switch comprises an arm pivotally mounted at one end thereof on the cradle and having the said two contacts insulated from one another and secured to the arm to extend from opposite side edges thereof, whereby movement of the arm to one side brings its leading contact into engagement with one of said two terminals and its following contact into engagement with said other pole, and movement of the arm in the opposite direction brings its said following contact into engagement with the other of said two terminals and its said leading contact into engagement with said other pole.

4. A reversing polarity device comprising a support means, a battery having an exposed positive pole and an exposed negative pole carried in said support means, said support means defining a point for electrical contact with one of said poles and a pair of cradle contact points electrically connected with said first mentioned point of contact, said pair of cradle contact points being electrically insulated from the other pole of said battery, and switching means connected to said support means so as to be movable between operative and inoperative positions, said switching means including a pair of switch contacts electrically insulated from one another, said pair of switch contacts being disposed so that each of said pair of switch contacts engage with said other pole in the inoperative position of said device and said switch contacts being movable to either of two postions in the operative position thereof whereby said switch contacts are disposed to bridge said other pole with either one or the other of said pair of cradle contacts so that the bridging of said other pole with one of said cradle contacts results in a current flow having a given polarity and the bridging of said other pole with the other of said cradle contact results in a current flow of opposite polarity.

5. A reversing polarity device comprising a cradle, a battery for supplying an electrical current supported in said cradle, said battery having an exposed positive pole and an exposed negative pole, means electrically insulating the battery from said cradle, means on said cradle forming a direct contact with one of said poles, and means on said cradle forming a pair of contacts adjacent the other of said poles, said cradle serving as an electrical conductor between said contacts, a switch means movably mounted on said cradle, said switch means including a pair of switch contacts which are adapted to be electrically connected to separate terminals of a motor, and said pair of switch contacts being rendered movable between inoperative position wherein said pair of switch contacts engage said other pole and operative position wherein said pair of switch contacts bridge between said other pole and one of said pair of contacts disposed adjacent said other pole.

6. A reversing polarity device comprising a cradle, a battery for supplying a source of electrical current supported in said cradle, said battery including a body having a positive pole exposed at one end thereof, and a negative pole exposed at the opposite end thereof, means integral with said cradle forming a contact for one of the poles, and means integral with said cradle forming a pair of cradle contacts disposed in juxtaposition to said other pole, means insulating the body of said battery from said cradle, said cradle serving as a conductor between said contacts, and a switching means including a lever pivotally mounted on said cradle adjacent said other pole and said pair of cradle contacts, said switch means including a pair of switch contacts connected to said lever so as to be electrically insulated from one another, said pair of switch contacts each being adapted to normally engage said other pole in the inoperative position of said device, and said pair of switch contacts bridging the distance between said other pole and one of said cradle contacts in the operative position thereof whereby the bridging of said other pole with one of said cradle contacts results in a current flow of one polarity and the bridging of said other pole with the other of said cradle contact results in a current flow of opposite polarity.

7. A reversing polarity device comprising a cradle, a battery for supplying a source of electrical current supported in said cradle, said battery including a body having a positive pole exposed at one end thereof, and a negative pole exposed at the opposite end thereof, means integral with said cradle forming a direct contact for said positive pole, and means integral with said cradle forming a pair of cradle contacts disposed in juxtaposition to said negative pole, means insulating the body of said battery from said cradle, said cradle serving as a conductor between said contacts, and a switching means including an actuating lever pivotally mounted on said cradle adjacent said negative pole and said pair of cradle contacts, said switch means including a pair of switch contacts connected to said lever so as to be electrically insulated from one another, said pair of switch contacts each being adapted to normally engage said negative pole in the inoperative position of said device, and said pair of switch contacts being adapted to bridge the distance between said negative pole and one of said cradle contacts in the operative position thereof whereby the bridging of said negative pole with one of said cradle contacts results in a current flow of one polarity and the bridging of said negative pole with the other of said cradle contact results in a current flow of opposite polarity.

References Cited by the Examiner

UNITED STATES PATENTS

| | | | |
|---|---|---|---|
| 1,911,342 | 5/1933 | Apple | 318—139 X |
| 2,593,941 | 4/1952 | Van Sciver | 318—280 |
| 2,808,481 | 10/1957 | Brennan | 220—60 X |

LLOYD McCOLLUM, *Primary Examiner.*

JOHN F. COUCH, *Examiner.*